United States Patent
Achour (10) Patent No.: US 10,236,563 B1
(45) Date of Patent: Mar. 19, 2019

(54) INTEGRATED RADIO AND SOLAR PANELS

(71) Applicant: Vivint, Inc., Provo, UT (US)

(72) Inventor: Maha Achour, Encinitas, CA (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/854,188

(22) Filed: Dec. 26, 2017

Related U.S. Application Data (63) Continuation of application No. 14/578,003, filed on Dec. 19, 2014, now Pat. No. 9,871,287.

(60) Provisional application No. 61/919,319, filed on Dec. 20, 2013.

(51) Int. Cl.
| | | |
|---|---|---|
| *H01Q 1/24* | (2006.01) | |
| *H01Q 21/30* | (2006.01) | |
| *H01Q 1/44* | (2006.01) | |
| *H04W 4/06* | (2009.01) | |
| *H04B 7/06* | (2006.01) | |

(52) U.S. Cl.
CPC ............ *H01Q 1/246* (2013.01); *H01Q 1/241* (2013.01); *H01Q 1/44* (2013.01); *H01Q 21/30* (2013.01); *H04W 4/06* (2013.01); *H04B 7/0617* (2013.01)

(58) Field of Classification Search
CPC ........ H04B 7/028; H01Q 1/241; H01Q 1/246; H04W 4/06

USPC ................ 455/90.3, 572, 574, 66.1, 63.4
See application file for complete search history.

(56) References Cited

U.S. PATENT DOCUMENTS

| | | | |
|---|---|---|---|
| 6,590,150 B1 * | 7/2003 | Kiefer | H01Q 1/28 136/258 |
| 8,442,454 B1 | 5/2013 | Ehrenberg | |
| 2012/0048328 A1 | 3/2012 | Solon | |
| 2012/0105288 A1 * | 5/2012 | Abe | G04C 10/02 343/702 |
| 2012/0287018 A1 * | 11/2012 | Parsche | H01Q 1/243 343/897 |
| 2012/0292385 A1 | 11/2012 | MacKay et al. | |
| 2015/0085478 A1 | 3/2015 | Richmond et al. | |

\* cited by examiner

*Primary Examiner* — John J Lee
(74) *Attorney, Agent, or Firm* — Holland & Hart, LLP (57) ABSTRACT

A solar panel array structure is used in network communications that comprises at least one support structure configured to support a solar panel array, wherein the at least one support structure comprises a metal portion. The metal portion comprises antenna connections that are configured to allow the metal portion to be used as a radio antenna. In some cases, a radio transceiver is connected to the antenna connections. A separate radio antenna may also be connected to the support structure or to the solar panel array. The radio transceiver may be used to transmit data through a wireless communication network.

20 Claims, 8 Drawing Sheets

INTEGRATED RADIO AND SOLAR PANELS

CROSS-REFERENCE TO RELATED APPLICATIONS

The present application is a continuation of U.S. patent application Ser. No. 14/578,003, filed Dec. 19, 2014, titled "INTEGRATED RADIO AND SOLAR PANELS," which claims priority to U.S. Provisional Patent Application Ser. No. 61/919,319, filed Dec. 20, 2013, titled "INTEGRATED RADIO AND SOLAR PANELS," and assigned to the assignee hereof, the disclosures of which are incorporated herein in their entireties by this reference.

TECHNICAL FIELD

The present disclosure relates generally to the deployment and integration of renewable energy sources and wireless networks, and relates specifically to apparatuses and methods for using solar-panel array supports or other mounting equipment as structures for wireless transmission in data networking.

BACKGROUND

The evolution of today's smart/green home and office space includes the deployment of solar panels on rooftops, parking covers, and ground setups. In parallel, there is an increasing need to provide high-speed internet access and other wireless communication services (e.g., cellular networks) to these homes, buildings, and user equipments (UEs) within cellular coverage without incurring the cost of extending fiber optic cables or other expensive routing means to end users' locations.

Typical wireless network antennas and other routing equipment takes up valuable, limited space on the tops of towers, buildings, and other structures. The antennas used in this equipment are typically obtrusive and aesthetically undesirable. Part of the reason for their size is due to the frequencies in which they operate, since lower transmission frequencies require larger antennas for optimal signal broadcasting. Modern wireless technology standards such as Long Term Evolution (LTE) operate in or around 400 megahertz or 700 megahertz. As a result, transmissions in these frequency ranges require considerably large antennas.

As these and other wireless networks proliferate, customers and wireless network providers have felt an increasing need for widespread connection links and an increasing need for space in which to locate the links.

SUMMARY

According to at least one embodiment, a solar panel array structure for network communications is provided, with the structure comprising at least one support structure configured to support a solar panel array, where the at least one support structure comprises a metal portion; and antenna connections to the metal portion that are configured to allow the metal portion to be used as a radio antenna or part of a radio antenna or part of a radio antenna. Antenna radiation patterns and polarization may be adjusted by varying the shape, direction, or material used to build the solar panels.

The solar panel array structure may further comprise a radio transceiver connected to the antenna connections. The connection of the radio transceiver may be configured for diversity, beamforming, or MIMO communication. Additionally, antenna radiation patterns and polarization may be adjustable by varying the shape of the solar panel array, a direction of the solar panel array, or materials comprised in the solar panel array. The radio transceiver may comprise at least one antenna separate from the metal portion and may be attached to attached to the at least one support structure. In some embodiments, the radio transceiver is selected from the group consisting of: a cellular network transceiver, a micro cell, and a femto cell. Other types of radio transceivers may also be used. The radio transceiver may be operable to wirelessly connect to a data transmission network via use of the metal portion as an antenna. In some cases, the antenna connections of more than one support structure are connected to the radio transceiver.

The solar panel array structure may further comprise a solar panel array supported by the at least one support structure and configured to provide power to the radio transceiver. The power provided may be at least partially stored by an energy storage system, and the radio transceiver may be configured to receive power from at least the energy storage system. The solar panel array structure may also comprise an external antenna mounted to the at least one support structure, which may be a directional antenna. A radio transceiver may be connected to the antenna connections and to the external single antenna or antenna array. The metal portion of a support structure may link the solar panel array to a building, such as by being an elongated support beam of the solar panel array, or may be embedded in the solar panel array. The metal portion may also be an at least partially reflective sun collector or reflector for the solar panel array. In some embodiments, the solar panel array may comprise a photovoltaic (PV) array.

According to another embodiment, a solar panel array structure for network communications is disclosed, with the structure comprising a plurality of support structures configured to support a solar panel array; a radio antenna mounted to at least one of the plurality of support structures; and a radio transceiver connected to the radio antenna and mounted to at least one of the plurality of support structures for diversity, beamforming, or Multiple Input-Multiple Output (MIMO) communication. In such structures, the radio antenna may comprise a directional antenna, and the directional antenna may be a patch antenna located between at least two of the plurality of support structures. Antenna radiation patterns and polarization may be adjusted by varying the shape, direction, or material used to build the solar panels.

According to yet another embodiment, a method of administering a wireless data network is disclosed, wherein the method comprises: providing a plurality of solar panel arrays supported by a plurality of support structures: connecting a plurality of radio transceivers to the solar panel arrays, the plurality of radio transceivers using the plurality of support structures as antennas; and transmitting data between the radio transceivers via the support structures.

In some embodiments, the radio transceivers are used as cellular network transceivers. One or more of the radio transceivers may be a Point to Point (PtP) link or a Point to Multi-Point (PtMP) link in the wireless data network. A plurality of the support structures of at least one of the solar panel arrays may be used as a sectorized antenna. In some methods, at least one of the solar panel arrays is provided on a rooftop, or at least one of the solar panel arrays may be provided on a sun shade or act as a sun shade.

The method may also comprise providing power to at least one of the plurality of radio transceivers from at least one of the plurality of solar panel arrays. The power provided may be at least partially stored in an energy storage device provided with the at least one of the plurality of radio transceivers, and the at least one of the plurality of radio transceivers may receive power at least partially from the energy storage device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The apparatuses, systems, methods described herein relate to wireless network communications made using antennas based on support structures of a solar panel array (e.g., a photovoltaic (PV) array). The apparatuses, systems, and methods described herein may provide rapid deployment of communications networks by leveraging structures able to act as antennas or used to host antennas in locations where they are already in use. Solar panel arrays, by nature, are commonly deployed in remote locations where other power sources may be expensive, difficult, or impossible to reach or in urban areas where green alternative energy is desired. Communications networks are also difficult to distribute to these remote areas or in dense urban areas, but by using a solar panel array as an antenna, power production and communications networks can be rapidly scaled in urban areas or extended to areas that would otherwise not be feasible. Additionally, even in areas where power or communication networks may be more readily available, solar panel arrays are often distributed across wide areas, and by using at least some of these arrays for network communications, residences, businesses, and other locations may more readily adopt and invest in solar energy and robust networking. In addition to encouraging renewable energy usage, using support structures as antennas may improve aesthetics of networking technologies by reducing the number of standalone antennas and by combining them with existing solar panel structures or eliminating the additional cost of rooftop access.

Reference herein may be made to photovoltaic (PV) technology, since it is a popular and conventional solar power generation technology, but it will be understood to those having skill in the art and having the benefit of the present disclosure that, in some embodiments, other solar energy technologies may be used in place of, or in addition to, PV technology described generally herein. Thus, a "PV array" may generally refer to a power-generating solar panel array, which in some embodiments may comprise other solar power generation technologies, such as, for example, concentrated solar power (CSP) or other related technologies.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
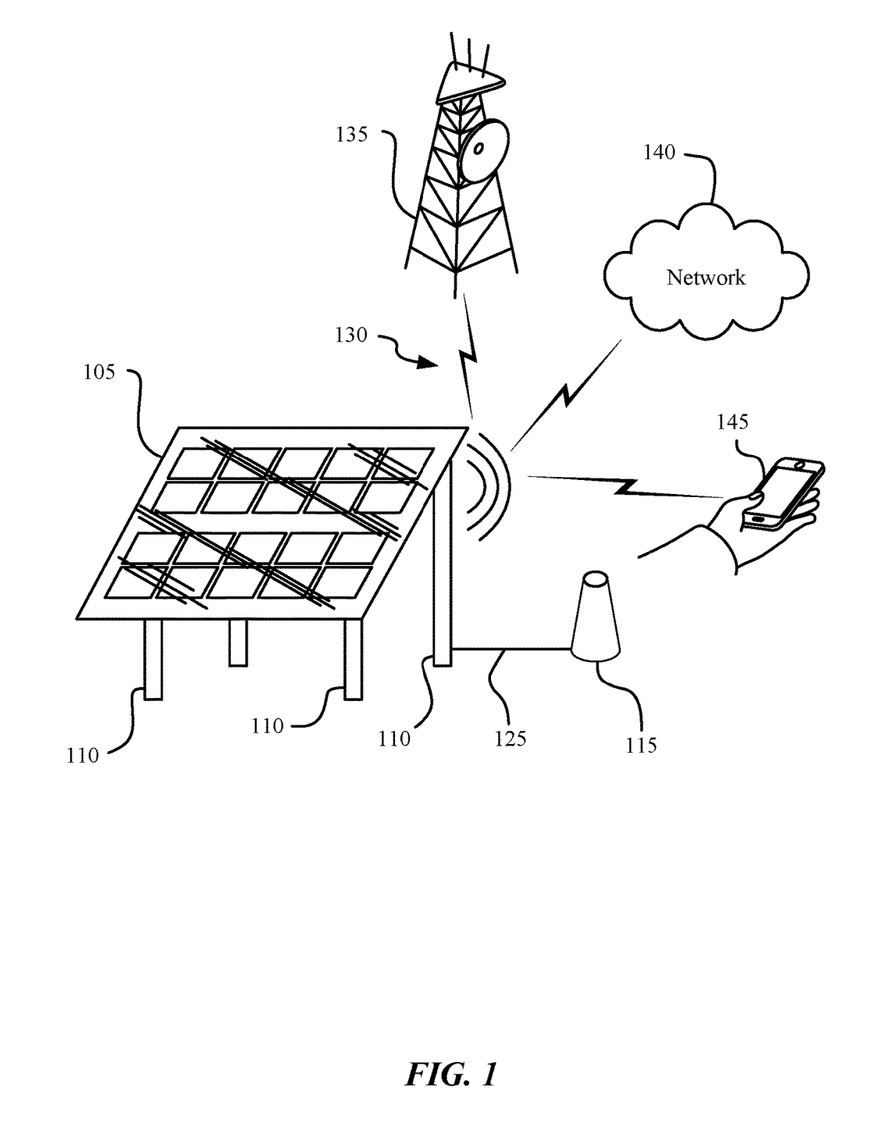
FIG. 1 is a block diagram of a solar-panel array used for network communications according to an exemplary embodiment of the present disclosure.

FIG. 1 shows a block diagram of a solar panel array 105 used for network communications according to an exemplary embodiment of the present disclosure. A solar panel array 105 may be supported by a plurality of support structures 110. A radio transceiver 115 may be connected to a metal portion of at least one of the support structures 110 by an antenna connection 125. The radio transceiver 115 may then use the metal portion of the support structures 110 to which it is attached as an antenna to send and receive signals. For example, wireless communications 130 may be established between the support structures 110 and a base station 135 or other network access point (see FIG. 3 and related description below), a network 140, and/or an end user 145 (e.g., user equipments (UEs)).

The solar panel array 105 may be a photovoltaic or other solar energy generator. The solar panel array 105 may generate electricity when receiving incident sunlight or radiation. In some embodiments, the solar panel array 105 may comprise a plurality of individual solar panel cells configured to generate electricity in conjunction with each other. The solar panel array 105 may be beneficially positioned where its surface will not be occluded by ambient conditions (e.g., shadows), such as, for example, on a rooftop of a residence, business, or industrial building, on top of a sunshade, or another area receiving significant sunlight. Preferably, the solar panel array 105 may be positioned higher than surrounding structures and away from large metal objects or lattices that may interfere with electromagnetic emissions, in a manner similar to how traditional antennas are positioned. This may improve signal quality for the wireless communications 130 conducted between the solar panel array 105 and other network points.

The support structures 110 support the solar panel array 105. The support structures 110 may be comprised of metal and other conductive materials having sufficient strength and rigidity to support the solar panel array 105 under normal operating conditions. For example, the support structures 110 may be secured to the underside of the solar panel array 105 and to the rooftop of a building, thereby fixedly attaching the solar panel array 105 to the building while the solar panel array 105 is subjected to winds, rain, and other inclement conditions. In some embodiments, the support structures 110 may be configured to support the solar panel array 105 at an angle. See. e.g., FIGS. 4-6. The support structures 110 may tilt the solar panel array 105 to face the direction of movement of the sun. Additionally, in some cases the support structures 110 may be configured to move the solar panel array 105 in response to movement of the sun, thereby decreasing the incident angle of the sunlight and increasing the efficiency of the solar panel array 105. For example, the support structures 110 may have adjustable length to adjustably change the angle of the solar panel array 105 or may be motorized to turn or tilt the solar panel array 105 over time. The support structures 110 may also form a frame on which a solar panel array 105 may be attached. For example, support structures 110 may extend across the rear surface of the solar panel array 105 parallel to the underside of the solar panel array 105. These support structures 110 may provide strength and rigidity to the planar shape of the solar panel array 105 and/or provide points of attachment for other support beams or support structures 110. See, e.g., support structures 420 in FIG. 4. In some embodiments, the solar panel array 105 may comprise the support structures 110 in a panel, such as between solar cells in solar panel array 105.

In some embodiments, the support structures 110 may comprise a metal portion. The metal portion may be a segment of a support structure used to provide strength and shape to the support structure or may be added to a support structure. For example, metal portions may be the portions of the support structures 110 that are attached to the underside of the solar panel array 105 and then attach to a surface below the solar panel array 105 using bolts, rivets, or other fastening means. Thus, the support structures 110 may be I-beams or other efficient rigid structural elements. In some embodiments, the metal portion may be large in comparison to the support structure of which it is a part to improve its ability to act as an antenna. The metal portion may therefore be relatively long and narrow and may act as a monopole or dipole antenna. Other shapes of metal portions may be devised that can simultaneously serve to support a solar panel array 105 and act as an antenna, such as, for example, a metal mesh, bar, or set of bars attached at the surface of the support structures 110. These shapes may be different in each support structure 110. In such cases, when the radio transceiver 115 is connected via an antenna connection 125 to each of these different metal portions, the radio transceiver 115 may more effectively communicate across different bands corresponding to the size and shape of each of the metal portions or over multiple special streams for diversity, beamforming, or MIMO communication. Antenna radiation patterns and poliarization may be adjusted by varying the shape, direction, or material used to build the solar panels. For example, one metal portion may be used for communications via Long Term Evolution (LTE) communications in one band and another may be used for Global System for Mobile Communications (GSM) on a different band. In some embodiments, the support structures 110 may comprise additional materials supporting the metal portions, such as, for example, wood or fiberglass. The size, shape, and materials of construction of solar panel array support structures that are presently being deployed may allow these existing support structures to be modified to serve as antennas according to the embodiments of the present disclosure. The antenna connection 125 may comprise a signal multiplexing or switching matrix to connect the plurality of support structures 110 to a single radio transceiver 115.

The radio transceiver 115 may be a transceiver for radio communications or other electromagnetic signals, such as millimeter-wave. For example, the radio transceiver 115 may be a cellular base station configured to provide cellular telecommunications. In some embodiments, the radio transceiver 115 may be a microcell or femtocell capable of acting as a node in a cellular telecommunications and/or data network. A microcell, femtocell, or other related small base station may be beneficial in the implementation of the present embodiments since it may fit underneath or attach to support structures 110 or the solar panel array 105 without taking up large amounts of space and without being heavy or otherwise difficult to move into position to existing solar panel arrays. In other embodiments, the radio transceiver 115 may be a different kind of transmitter, such as, for example, an AM or FM transmitter, an amateur radio transmitter, Ham radio. CB radio, or Wi-Fi/Wimax router for wireless internet connectivity. The radio transceiver 115 may comprise amplifiers, filters, multiplexors, switches, decoders, transceivers, signal processors, computers, or other necessary equipment for radio transmissions. The radio transceiver 115 may be attached to a surface of the solar panel array 105 or support structures 110, may be attached to a surface near the solar panel array 105 (e.g., to a rooftop or within an enclosure on top of a sunshade), or may be positioned distant from the solar panel array 105 (e.g., within a building or residence) and connected to the support structures 110 via a wired or wireless connection medium, such as the antenna connection 125. A radio transceiver 115 may comprise one or more antennas in addition to using the support structures 110 as one or more antennas.

In some embodiments, multiple radio transceivers 115 may be provided. The multiple radio transceivers 115 may all use the same support structures 110 as antennas, and/or the radio transceivers 115 may each use a subset of the support structures 110 as antennas. For example, each radio transceiver 115 may use a separate support structure 110 as an antenna, or the radio transceivers 115 may use more than one support structure 110 as an antenna via a switching configuration. Multiple radio transceivers 115 may use the same support structure 110 as an antenna as well, such as in configurations where the multiple radio transceivers 115 provide different kinds of connectivity. For example, in some embodiments, one radio transceiver 115 may operate in LTE communications and another radio transceiver 115 may operate in amateur frequencies using the same support structure. These radio transceivers 115 may be configured to use a switching circuit to allow sequential use of the antenna.

The antenna connection 125 connects the radio transceiver 115 to a support structure 110. For example, the antenna connection 125 may be wiring or ports connected between the radio transceiver 115 and the metal portion of the support structure 110. In some embodiments, the antenna connection 125 may link the radio transceiver 115 through an enclosure, wall, or other obstacle. The antenna connection 125 may also comprise a set of connection points on the support structure 110 that allow the radio transceiver 115 to be attached. The connection points may also allow the radio transceiver 115 to be removed or exchanged. An antenna connection 125 may link one or more radio transceiver 115 to one or more support structure 110 for diversity, beamforming, or MIMO communication. In some embodiments, the radio transceiver 115 may be connected to a support structure 110 without a separate antenna connection 125.

The wireless communications 130 between the support structure 110 as an antenna and the base station 135, network 140, and/or end user 145 may be any electromagnetic signal communications, such as, for example, cellular telecommunications or data communications, wireless networking (e.g., Wi-Fi or WLAN), radio broadcasting or intercommunications, and the like. While the present disclosure relates primarily to cellular telecommunications and related connectivity, any antenna-based communications may be considered to be within the scope of the embodiments described herein. Thus, the techniques described herein are not limited to LTE or any other specific communications standard, and may also be used for various wireless communications systems such as CDMA, TDMA, FDMA, OFDMA, SC-FDMA, and other systems. The terms "system" and "network" may be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX). IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes a cellular telecommunications system for purposes of example, and related terminology is used in much of the description below, although the techniques are applicable beyond cellular telecommunications applications. Other related standards are 802.11n and 802.11ac for broadband connectivity using MIMO and beamforming technologies.

The base station 135 is shown as a cellular base station tower. The base station 135 may be any other node in a telecommunications network, including, for example, another solar panel array structure antenna-based cell or station in the network or a telecommunications satellite. See also FIG. 3. The metal portion used as an antenna of the support structure 110 may be shaped and oriented for proper communications with the network in which it will operate. The network 140 may be any communications network or link, such as an intranet or internet connection, local area network (LAN), wide area network (WAN), satellite link, or other network that allows computers and other devices to exchange data or signals at least in part through electromagnetic signal transmission and/or reception. More information regarding the nature of a network in which at least some of the present embodiments may be implemented is provided in connection with FIG. 3.

The end user 145 is shown as a mobile device such as a cellular phone or tablet. The end user 145 may be any variety or combination of these devices or related electronic devices, such as, for example, a laptop or other computer, a smartphone, a networking hotspot, or a Wi-Fi modem and/or router.

By using one or more support structure 110 as an antenna for a radio transceiver 115, wireless networking nodes may be quickly and easily implemented without obtrusive and unsightly radio antennas. They may also be used in areas where fiber optic lines or other wired telecommunications lines have not been thoroughly implemented. Furthermore, the solar panel array may be used to support wireless networking and communications in areas where electrical power lines are not available, such as in rural areas or during power outages. Additional aspects of these features will be disclosed or apparent from this disclosure.

Figure 2:
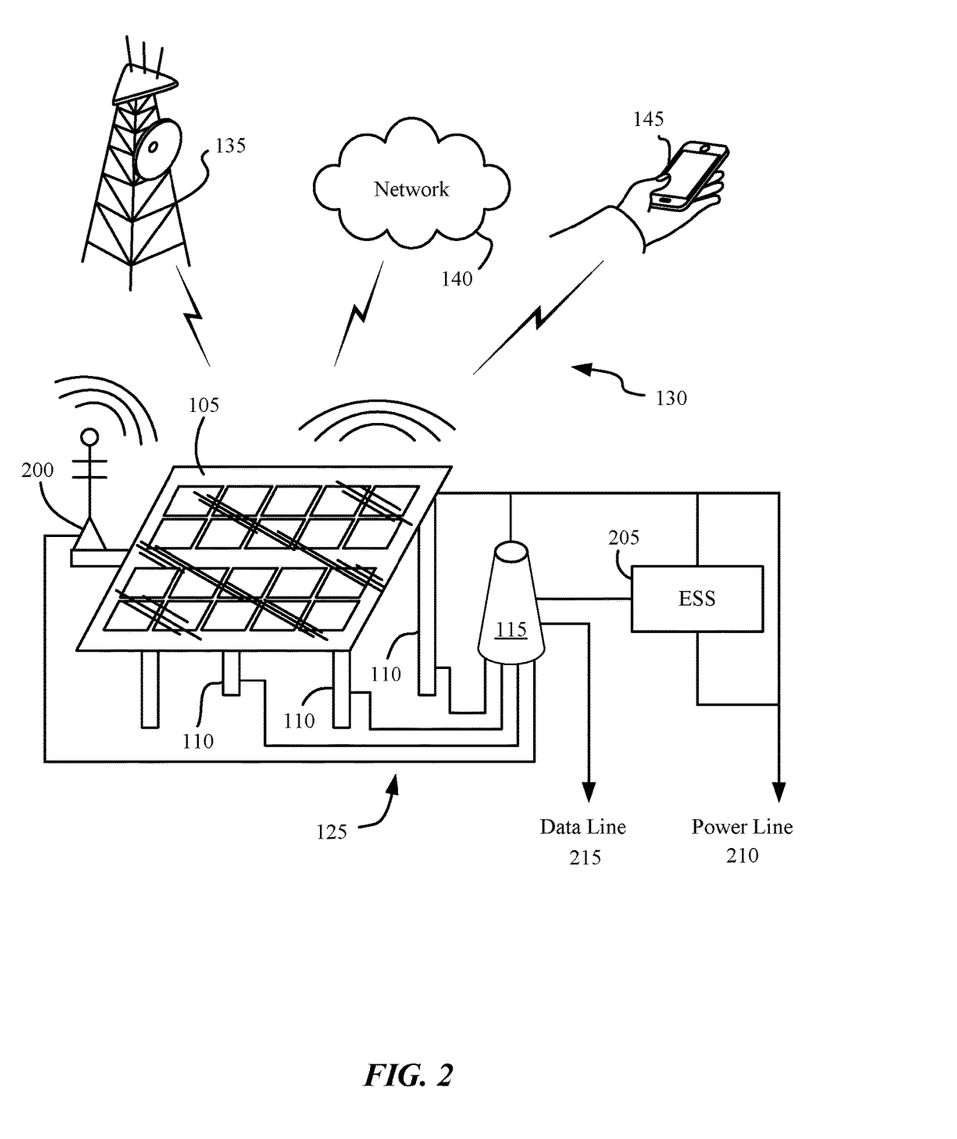
FIG. 2 is a block diagram of a solar panel array used as a network antenna according to another exemplary embodiment of the present disclosure.

FIG. 2 is a block diagram of a solar panel array 105 used for network communications according to another exemplary embodiment of the present disclosure. The solar panel array 105 may be an example of the solar panel array 105 described with reference to FIG. 1. In one embodiment, the solar panel array 105 is shown with multiple support structures 110 connected to a radio transceiver 115 via multiple antenna connections 125. An external antenna 200 is attached to the solar panel array 105 and connected to the radio transceiver 115 via an antenna connection 125 as well. External antenna 200 may be used with multiple antenna connections 125 for diversity, beamforming, or MIMO communication. Using the support structures 110 and external antenna 200, the radio transceiver 115 may establish wireless communications 130 with various other devices, structures, and networks (e.g., elements 135, 140, 145). The solar panel array 105 may generate electricity that may be stored in an energy storage system (ESS) 205 or transmitted to a power line 210. The ESS 205 may provide energy to the radio transceiver 115 via a power connection or may provide energy to the power line 210. The radio transceiver may have a data connection that allows communication of data via a data line 215 and/or may receive power from the solar panel array 105.

The radio transceiver 115 may be attached to the solar panel array 105 or support structures 110 or may be located elsewhere, as described in connection with FIG. 1. With multiple antenna connections 125, the radio transceiver 115 may use each antenna individually or may use multiple antennas as a sectorized antenna or an antenna array.

External antenna 200 may be an antenna attached to the solar panel array 105 for diversity, beamforming, or MIMO communication. The external antenna 200 may be a directional antenna such as a parabolic antenna or a patch antenna. It may be attached to a side of the solar panel array 105 or to a support structure 110. In some embodiments, the external antenna 200 may be connected to multiple support structures, as shown in antennas 505 of FIG. 5 below. Multiple external antennas 200 may be supported by the solar panel array 105. The external antenna 200 may be designed to serve purposes in addition to acting as an antenna, such as an antenna that is constructed with a reflective surface that is positioned on the solar panel array 105 to reflect sunlight into the solar panel cells and thereby improve the efficiency of the solar panel array 105 in addition to increasing the transmission capability of the radio transceiver 115. In some arrangements, the external antenna 200 may work independent of the antennas formed by the support structures 110, and in some arrangements it may work in conjunction with or in cooperation with the support structure 110 antennas.

The energy storage system (ESS) 205 may be a means for storing electrical energy generated by the solar panel array 105. The ESS 205 may therefore be comprised of batteries or other electrochemical cells, capacitors, supercapacitors, and/or other energy storage devices. The ESS 205 may be charged by the solar panel array 105 and may provide power where the solar panel array 105 is located, such as by serving as a battery backup power supply for electrical systems at the site. The ESS 205 may also provide electrical energy to the radio transceiver 115. In doing so, the ESS 205 may allow the radio transceiver 115 to operate in the absence of a connection to an electrical power grid and while the solar panel array 105 is not producing enough energy to sustain the load required by the radio transceiver 115. The ESS 205 may therefore improve the stability and reliability of the radio transmissions of the radio transceiver 115 and support structures 110 and allow them to continue during power outages or on days when weather conditions would otherwise restrict the generation of the solar panel array 105.

Power line 210 links the power of the solar panel array 105 to the site in which it is located. The power line 210 may be linked to the ESS 205, such as through use of a grid-tied inverter or other power conditioning apparatus, as needed. In some embodiments, the power line 210 may provide power to the radio transceiver 115. The power line 210 may also provide power to charge the ESS 205. In some embodiments, the power line 210 is not connected to the structure or site in which it is located, but may provide power to the radio transceiver 115, ESS 205, or both.

Data line 215 illustrates a wired data connection between the radio transceiver 115 and another link in a data transmission network. For example, the data line 215 may be an Ethernet link to a hub or LAN at the site. In some embodiments, the data line 215 may link to a wireless router to provide localized internet connectivity via a link to the network 140 or base station 135.

Figure 3:
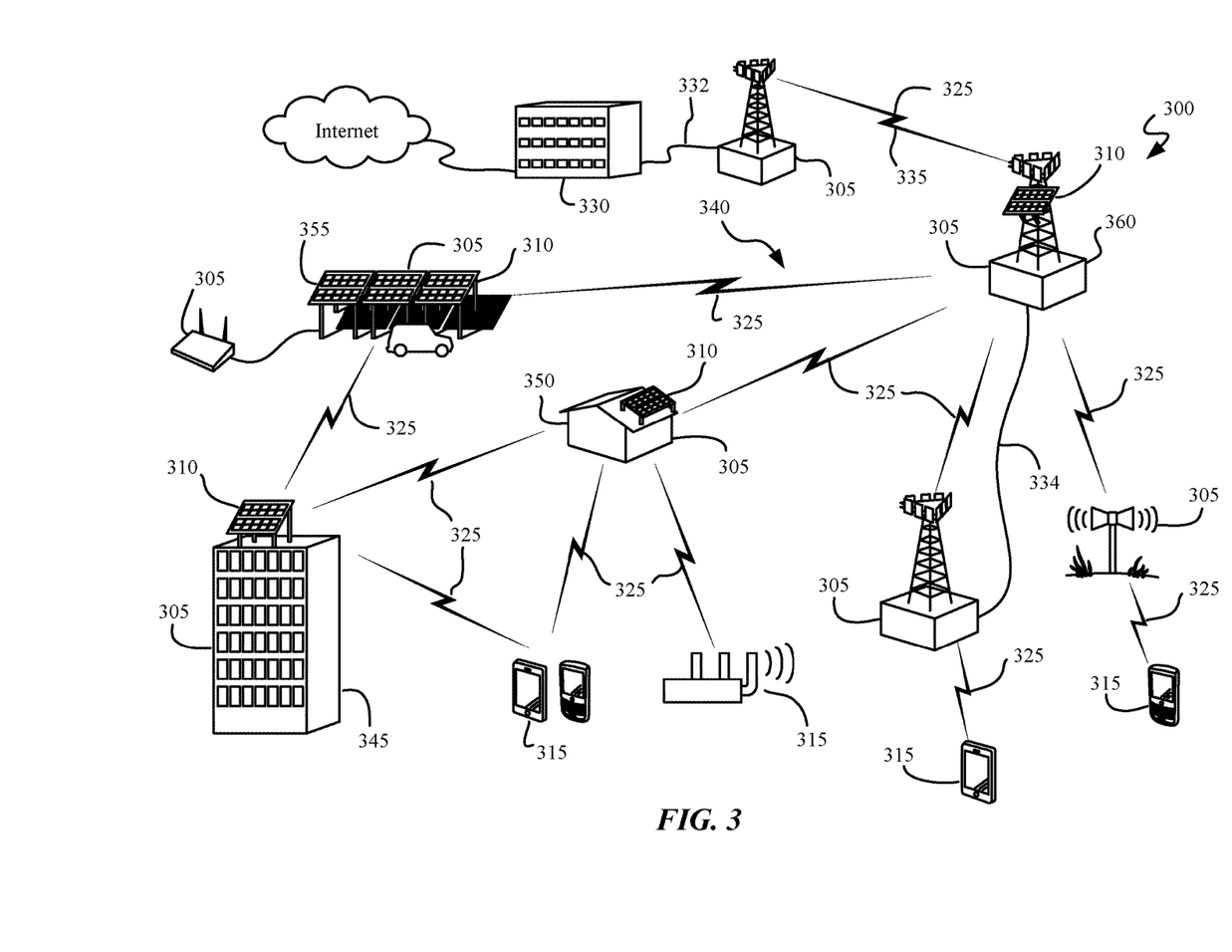
FIG. 3 is a diagram of solar panel arrays used as network antennas in a communications network according to an exemplary embodiment of the present disclosure.

FIG. 3 shows a block diagram of a wireless communication system 300, in accordance with various aspects of the present disclosure. The wireless communication system 300 includes a plurality of access points (e.g., base stations, evolved NodeBs (eNBs), or wireless local area network (WLAN) access points) 305, a number of user equipments (UEs) 315, and a link to a core network 330 (e.g., an ISP). The access points 305 may be examples of the access points (e.g., base stations 135) described in FIGS. 1 and/or 2. The UEs 315 may be examples of the end user devices 145 described in FIGS. 1 and/or 2.

Some of the access points 305 may communicate with the UEs 315 under the control of a base station controller (not shown), which may be part of the core network 330 or certain access points 305 (e.g., base stations or eNBs) in various embodiments. Some of the access points 305 may communicate control information and/or user data with the core network 330 through backhaul 332. In some embodiments, some of the access points 305 may communicate, either directly or indirectly, with each other over backhaul links 334, which may be wired or wireless communication links. The wireless communication system 300 may support operation on multiple carriers (waveform signals of different frequencies). Multi-carrier transmitters can transmit modulated signals simultaneously on the multiple carriers. For example, each communications link 325 may be a multi-carrier signal modulated according to various radio technologies. Each modulated signal may be sent on a different carrier and may carry control information (e.g., reference signals, control channels, etc.), overhead information, data, etc.

The access points 305 may wirelessly communicate with the UEs 315 via one or more access point antennas. Each of the access points 305 may provide communication coverage for a respective coverage area. In some embodiments, an access point 305 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The wireless communication system 300 may include access points 305 of different types (e.g., macro, micro, femto, and/or pico base stations). The access points 305 may also utilize different radio technologies, such as cellular and/or WLAN radio access technologies. The access points 305 may be associated with the same or different access networks or operator deployments. The coverage areas of different access points 305, including the coverage areas of the same or different types of access points 305, utilizing the same or different radio technologies, and/or belonging to the same or different access networks, may overlap.

Various access points 305 may include solar panel array-based antennas 310, such as, for example, the solar panel array 105 and radio transceiver 115 systems described in connection with FIGS. 1 and/or 2. Other access points may not use these antennas 310. The access points 305 having solar panel array-based antennas 310 may be integrated with any other access points 305 in the network, including Point-to-Point (PtP) links (e.g., link 335) or Point to Multiple Point (PtMP) links (e.g., links 340 linking several access points 305 to base station 360). Access points 305 having solar panel array-based antennas 310 may include business or industrial locations 345, residences 350, sunshades 355 (e.g., in a parking area or at a public transit stop), at a base station 360, or other locations where a solar panel array may be used to generate electricity. Positioning the solar panel array-based antennas 310 on a rooftop or tower may improve their range and signal quality.

In some embodiments, the wireless communication system 300 may include an LTE/LTE-A communications system (or network), which LTE/LTE-A communications system may support one or LTE-U modes of operation or deployment scenarios. In other embodiments, the wireless communication system 300 may support wireless communications using an unlicensed spectrum and an access technology different from LTE-U, or a licensed spectrum and an access technology different from LTE/LTE-A. In LTE/LTE-A communications systems, the term evolved NodeB or eNB may be generally used to describe of the access points 305. The wireless communication system 300 may be a Heterogeneous LTE/LTE-A/LTE-U network in which different types of eNBs provide coverage for various geographical regions. For example, each eNB (e.g., access point 305) may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 330 may communicate with the eNBs (e.g., access points 305) via a backhaul 332 (e.g., SI application protocol, etc.). The eNBs (e.g., access points 305) may also communicate with one another, e.g., directly or indirectly via backhaul links 334 (e.g., X2 application protocol, etc.) and/or via backhaul 332 (e.g., through core network 330). The wireless communication system 300 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 315 may be dispersed throughout the wireless communication system 300, and each UE 315 may be stationary or mobile. A UE 315 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 315 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 315 may be able to communicate with macro eNBs, pico eNBs, femto eNBs, relays, and the like. A UE 315 may also be able to communicate over different access networks, such as cellular or other WWAN access networks, or WLAN access networks.

The communications links 325 shown in wireless communication system 300 may include uplinks for carrying uplink (UL) transmissions (e.g., from a UE 315 to an eNB (e.g., access point 305)) and/or downlinks for carrying downlink (DL) transmissions (e.g., from an eNB (e.g., access point 305) to a UE 315). The UL transmissions may also be called reverse link transmissions, while the DL transmissions may also be called forward link transmissions. The downlink transmissions may be made using a licensed spectrum (e.g., LTE), an unlicensed spectrum (e.g., LTE-U), or both (LTE/LTE-U). Similarly, the uplink transmissions may be made using a licensed spectrum (e.g., LTE), an unlicensed spectrum (e.g., LTE-U), or both (LTE/LTE-U).

In some embodiments of the wireless communication system 300, various deployment scenarios for LTE-U may be supported, including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations or eNBs (e.g., access points 305) as well as UEs 315 may support one or more of these or similar modes of operation. Orthogonal Frequency-Division Multiple Access (OFDMA) communications signals may be used in the communications links 325 for LTE downlink transmissions in an unlicensed and/or a licensed spectrum, while Single Carrier Frequency Division-Multiple Access (SC-FDMA) communications signals may be used in the communications links 325 for LTE uplink transmissions in an unlicensed and/or a licensed spectrum.

Figure 4:
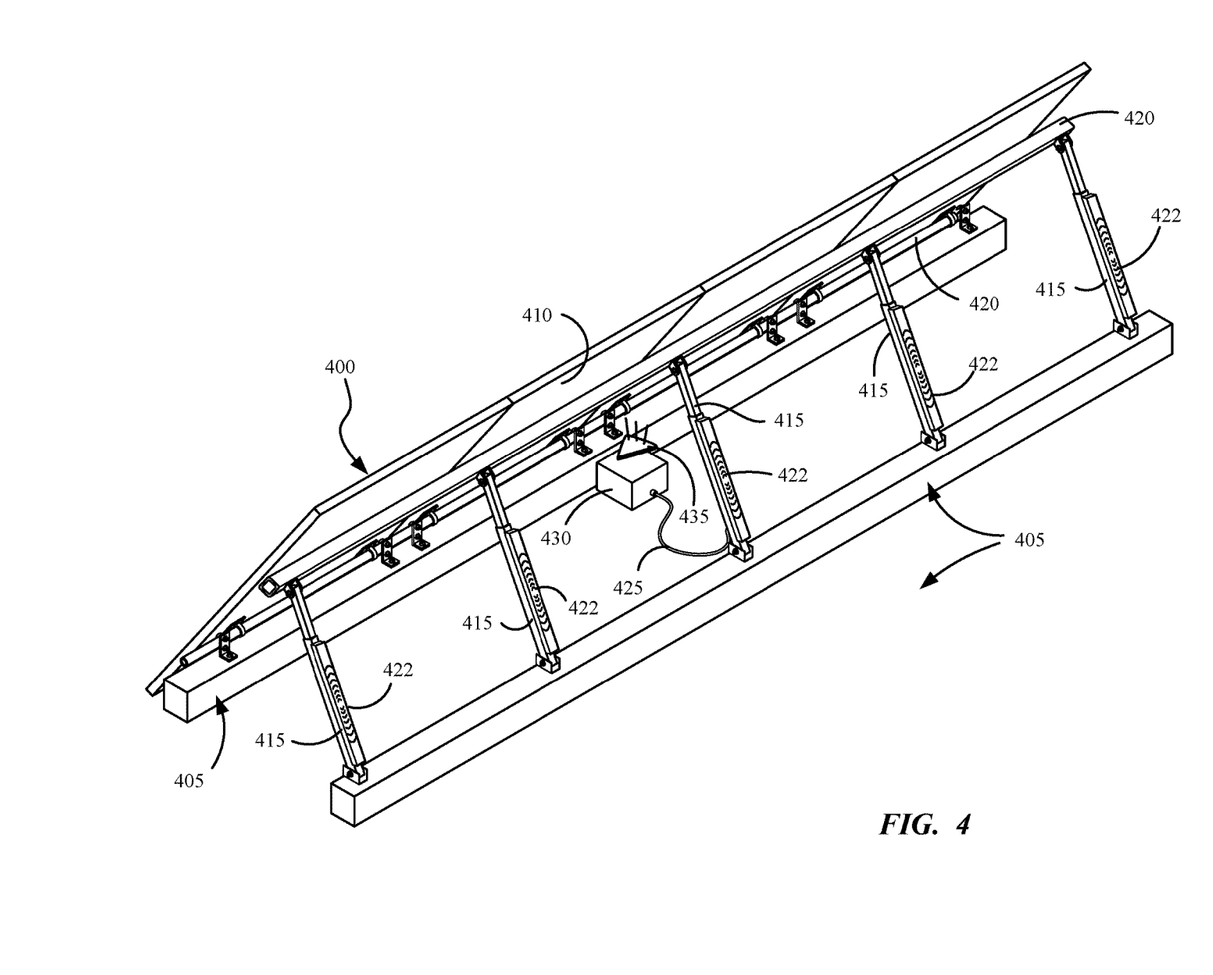
FIG. 4 is an illustration of an exemplary embodiment of a solar panel array having support structures used as antennas for a radio transceiver according to an embodiment of the present disclosure.

FIG. 4 is an illustration of an exemplary embodiment of a solar panel array 400 having support structures 415, 420 used as antennas for a radio transceiver 430 according to an embodiment of the present disclosure. The solar panel array 400 may be an example of the solar panel array 105 described in FIGS. 1 and/or 2. The radio transceiver 430 may be an example of the radio transceiver 115 described in FIGS. 1 and/or 2 and the access points 305 described in FIG. 3 that may be connected to one or more antennas for diversity, beamforming, or MIMO communication.

The radio transceiver 430 is shown underneath the solar panel array 400 and may be connected to the rooftop 405 or surrounding structures. The solar panel array 400 may be positioned on a structure such as a rooftop 405 where the solar panel array 400 may receive solar radiation. The underside 410 of the solar panel array 400 is shown in this figure, where a plurality of support structures 415, 420 support or hold the solar panel array 400 to face the sky. The solar panel array 400 may be positioned at an angle, as shown in FIG. 4, but it may also be horizontal or vertical, according to the needs of the user and the location in which it is deployed. For example, in some embodiments it may be beneficial to reduce efficiency of the solar panel array 400 by changing its optimal angle for energy generation in favor of changing the dimensions of the support structures 415 for optimal usage as antennas.

The support structures 415, 420 may comprise metal portions 422 suitable for use as antennas. The metal portions 422 may comprise a conductive material such as, for example, copper, aluminum, gold, steel, or zinc. The metal portions 422 may be beneficially resistant to oxidation, corrosion, exposure to outdoor conditions, and other conditions that may decrease structural integrity or the effectiveness of the metal portions 422 when used as antennas. In some embodiments a cover or protective layer may be added to the metal portions, such as a polymer shield or paint coating.

The metal portions 422 may extend longitudinally along the support structures 415, 420. The metal portions 422 may therefore function as vertically polarized antennas or may be oriented to function as horizontal polarized antennas (not shown). The support structures 415, 420 being used as antennas (e.g., via an antenna connection 425 to a radio transceiver 430) may beneficially be spaced apart to not significantly interfere with signals being sent to or from the support structures 415, 420 used as antennas or an antenna 435 of the radio transceiver 430. In some embodiments, the support structures 415, 420 may be used as a sectorized antenna, wherein multiple support structures 415, 420 may be used simultaneously or selectively by the radio transceiver 430 depending on the signals being received or transmitted. In such cases, metal portions 422 may be oriented at different angles or facing different directions to enhance the number, size, or strength of usable sectors. Additionally, some support structures 415, 420 may have different orientations to enhance connectivity in specific sectors, such as being oriented non-parallel to other support structures 415, 420. For example, support structures 415 may be used for one sector and support structures 420 may be used for another sector.

In some embodiments, the support structures 415 provide support between the underside 410 of the solar panel array 400 and the rooftop 405 (or other support surface). In some embodiments, the support structures 415 may comprise I-beams or other efficient rigid structural members. The support structures 415 may be bolted, riveted, or otherwise fastened to the rooftop 405. The support structures 415 may also be removably or movably attached to the rooftop 405, thereby allowing the solar panel array 400 to be repositioned. In some embodiments, the solar panel array 400 may be repositioned by a motorized system such as a solar tracking system. In embodiments with movable support structures, the solar panel array 400 may use the motorized system to track motion of the sun, and in some cases, the motorized system may be used to reposition the solar panel array 400 and support structures 415, 420 to at least temporarily enhance signal transmission from the radio transceiver 430 via the one or more support structures 415, 420 being used as antennas.

Figure 6:
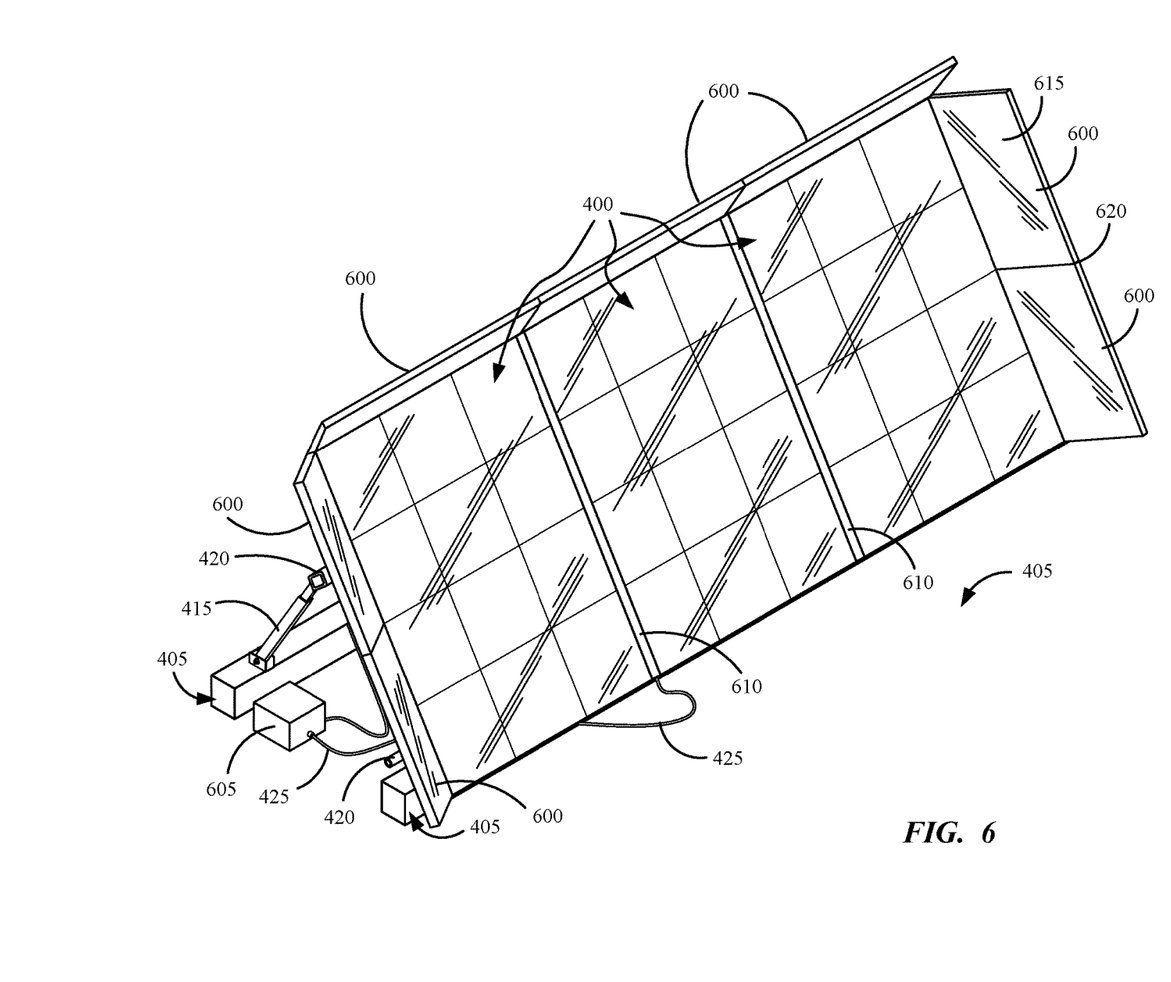
FIG. 6 is an illustration of another exemplary embodiment of a solar panel array having support structures and panels used as antennas for a radio transceiver according to an embodiment of the present disclosure.

Support structures 420 may also provide connection between support structures 415 and the underside 410 of the solar panel array 400 and may provide structural strength and rigidity to the solar panel array 400 by attachment to its underside 410 or by being directly integrated with the solar panel array 400 panels themselves (see also FIG. 6).

Figure 5:
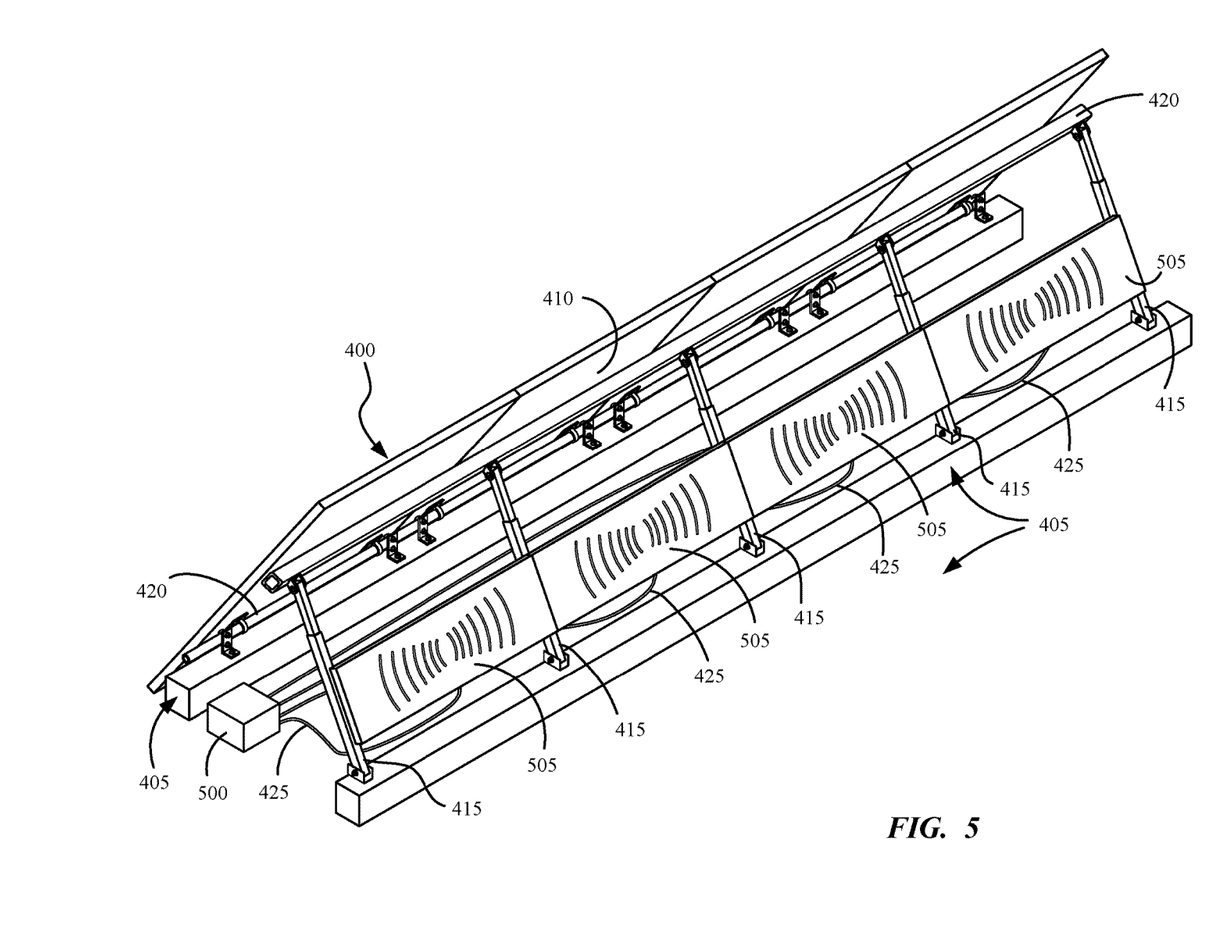
FIG. 5 is an illustration of an exemplary embodiment of a solar panel array having support structures connected to antennas for a radio transceiver according to an embodiment of the present disclosure.

FIG. 5 is an illustration of an exemplary embodiment of a solar panel array 400 having support structures 415, 420 connected to antennas for a radio transceiver 500 according to another embodiment of the present disclosure. The solar panel array 400 may be an example of the solar panel array 105 described in FIGS. 1 and/or 2 and the solar panel array 400 described in FIG. 4. The radio transceiver 500 may be an example of the radio transceiver 115 described in FIGS. 1 and/or 2, the access points 305 described in FIG. 3, and the radio transceiver 430 described in FIG. 4.

The radio transceiver 500 may be mounted to the underside 410 of the solar panel array 400 or to support structures 415, 420 and may have an antenna connection 425 to a plurality of external antennas 505 or antenna arrays for diversity, beamforming, or MIMO communication. The antennas within the antenna array may have low coupling due to the large separation between the support structures 415, 420. Furthermore, the external antennas 505 may be identical or different in design depending on the application. The external antennas 505 may be attached to the support structures 415, 420, such as extending between multiple support structures 415. The external antennas 505 may be directional antennas or omnidirectional antennas, such as, for example, monopole antennas, patch antennas, or sector antennas. Although multiple external antennas 505 are shown attached to the support structures 415, in some embodiments, one external antenna 505 may be used. External antennas 505 may also be used in conjunction with support structures 415, 420 used as antennas. Multiple antenna connections 425 may be implemented as necessary to establish function of multiple antennas with the radio transceiver 500 for diversity, beamforming, nulling, and MIMO communication.

In some embodiments, multiple radio transceivers 430, 500 may be provided, separately or simultaneously using the various antennas connected to the solar panel array 400, such as metal portions 422 or external antennas 505. These radio transceivers 430, 500 may thus be used for diversity, beamforming, or MIMO communication. The antennas within these antenna arrays may have low coupling due to the large separation between the solar panel support structures 415, 420. Use of multiple radio transceivers 430, 500 may increase the types or strength of connectivity provided by the antennas.

FIG. 6 is an illustration of another exemplary embodiment of a solar panel array 400 having support structures 415, 420, 610 and panels 600 used as antennas for a radio transceiver 605 according to another embodiment of the present disclosure. The solar panel array 400 may be an example of the solar panel array 105 described in FIGS. 1 and/or 2 and the solar panel array 400 described in FIGS. 4 and/or 5. The radio transceiver 605 may be an example of the radio transceiver 115 described in FIGS. 1 and/or 2, the access points 305 described in FIG. 3, the radio transceiver 430 described in FIG. 4, and the radio transceiver 500 described in FIG. 5.

The solar panel arrays 400 and support structures 415, 420, 610 may provide support to panels 600. For example, the panels 600 may be attached thereto. In some embodiments, the panels 600 may be supported by the rooftop 405 (or other surrounding features) along with, or independent of, the solar panel array 400 and its supports. The panels 600 may be positioned around the periphery of the solar panel array 400. The panels 600 may beneficially be reflective panels configured to direct sunlight toward the operative side of the solar panel array 400 to increase the efficiency of the solar panel array 400. Thus, the panels 600 may comprise a metallic reflective surface 615 or other metal portion (e.g., a metal support frame 620). In some embodiments the panels 600 may provide protection to the solar panel array 400 from debris or moisture (e.g., precipitation such as snow) to prolong the life of the solar panel array 400 or to keep it clear of obstructions. In some embodiments, the backsides of the panels 600 may have a metal portion used as an antenna.

The panels 600 may each individually or collectively be connected to the radio transceiver 605 associated with the solar panel array 400 via one or more antenna connections 425. By doing so, the panels 600 may act as antennas for the wireless transmission of data via the radio transceiver 605. The panels 600 may therefore also be positioned or angled to enhance their signal reception and transmission. In some embodiments, the positioning of the panels 600 may be dictated by a balance of reflecting light toward the solar panel array 400 against operating as an antenna for the radio transceiver 605. One or more of a reflective surface 615 and a metal support frame 620 of a panel 600 may act as the antenna when attached to an antenna connection 425. Thus, each portion 615, 620 of a panel may be simultaneously or individually used as an antenna. A panel 600 used as an antenna may effectively be used as an omnidirectional antenna, directional antenna, or patch antenna, and the various directions to which the panels 600 face make them especially suited for transmissions in multiple directions.

In some embodiments, the solar panel array 400 has support structures 610 integrated with the solar panel panels of the array. These support structures may comprise metal portions similar to metal portions 422 of FIG. 4, which can be connected via an antenna connection 425 to the radio transceiver 605 for use as antennas. The support structures 610 may be beams running through the solar panel array 400 as shown in FIG. 6, and in some embodiments, the support structures 610 may be horizontally positioned or form a mesh or other pattern across the solar panel array 400. It may be beneficial to use support structures 610 as antennas because they may be larger than rear-positioned support structures (e.g., support structure 415) since they may run the entire length or height of the solar panel array 400. Thus, support structures 610 may be especially suited for lower-frequency transmissions that may be made using larger antennas.

Figure 7:
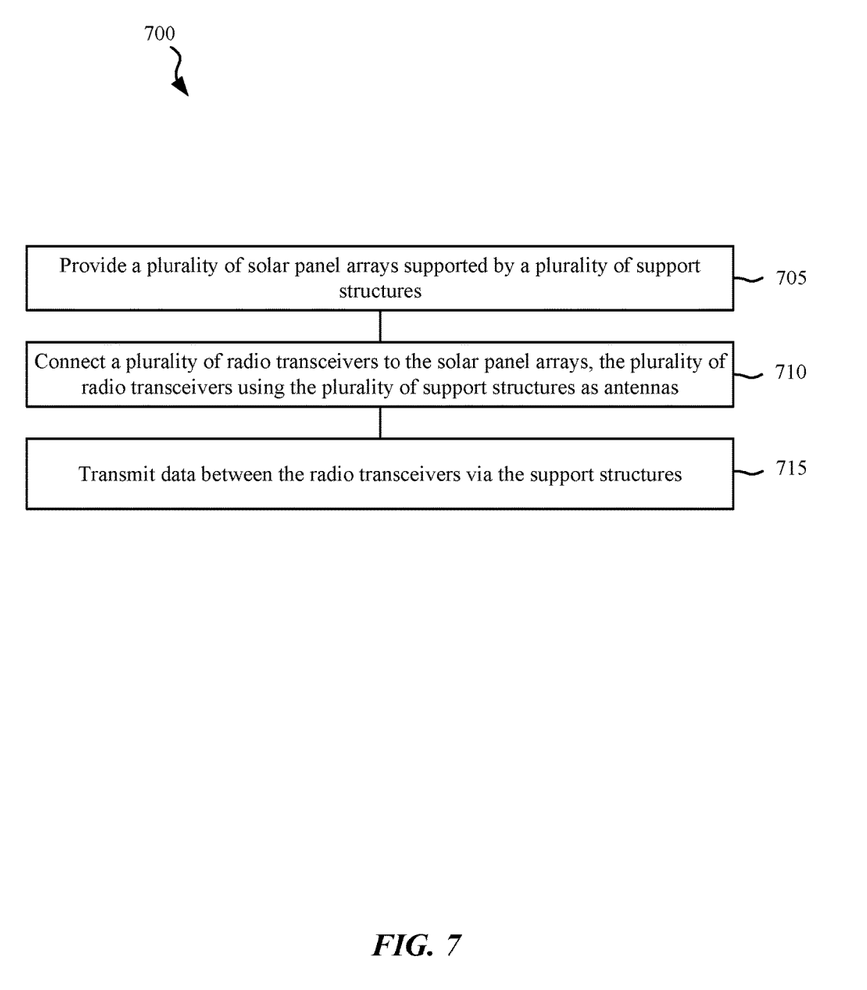
FIG. 7 is a flowchart illustrating a process of administering a communications network according to an embodiment of the present disclosure.

FIG. 7 is a flowchart illustrating a process 700 of administering a communications network according to an embodiment of the present disclosure. The process 700 begins with block 705, wherein a step of providing a plurality of solar panel arrays supported by a plurality of support structures is described. The solar panel arrays may include solar panel arrays 105, 400 disclosed in association with other embodiments herein described in FIGS. 1, 2, 4, 5, and/or 6. The solar panel arrays may comprise any kind of solar panels or other photovoltaic cells. The support structures may include support structures 110, 415, 420, 610 disclosed in association with other embodiments herein described in FIGS. 1, 2, 4, 5, and/or 6. Providing the solar panel arrays may include installing, maintaining, supporting, using, building, or selling the solar panel arrays, or may include otherwise using the solar panel arrays or making them available for use. The support structures may be attached to the solar panel arrays or an installation location, or may accompany the solar panel arrays or be added thereto.

In block 710, a plurality of radio transceivers are connected to the solar panel arrays. The radio transceivers use the plurality of support structures as antennas. The radio transceivers used may include radio transceivers 115, 430, 500, 605 described in connection with other figures and embodiments, such as those described in FIGS. 1, 2, 3, 4, 5, and/or 6. In some embodiments, the radio transceivers may be connected to the solar panel arrays by antenna connections (e.g., antenna connections 125, 425). The radio transceivers may use the plurality of support structures as antennas by connecting the support structures to antenna connections for the radio transceivers. Using the support structures as antennas may include attaching a metal portion of a particular support structure to antenna connections to a radio transceiver or adjust antenna radiation patterns and polarizations. When one or more metal portions are attached to one or more radio transceivers, the antenna arrays created may be used as antennas by the radio transceivers for the transmission of data using any antenna-based electromagnetic communications means, including the standards, means, and methods described previously herein including diversity communication such as beamforming and MIMO technologies. The Antennas within the antenna array may have low coupling due to the large separation between solar panel supports.

At block 715, data is transmitted between radio transceivers via the support structures. A computer or control circuit may be connected to the radio transceiver and stimulate a signal to be transmitted from metal portions of the support structures. The support structures connected as antennas may be used individually or used in multiples or sets. The one or more support structures used as antennas may make a transmission on a selected band or frequency (e.g., LTE and the other communications types described in connection with FIGS. 1 and/or 3) and establish one-way or two-way communication with another radio transceiver. For example, the radio transceiver connected to a solar panel array may act as a PtP or PtMP node in a network and transmit data to other nodes. The radio transceiver may also transmit data to UEs or other devices connected to UEs. The radio transceiver may also simply broadcast a signal without establishing a specific link to another device or access point. The radio transceiver may also support diversity, beamforming, nulling, or MIMO. The solar panel antenna support system may also include different parts to adjust antenna polarization and radiation patterns. In some embodiments, multiple solar panel array-based radio transceivers represent multiple points or nodes in a network of connected devices or stations. The solar panel array antenna stations may communicate directly with each other, or may operate with other network nodes (e.g., base stations, repeaters, and the like) as intermediate points. In some embodiments, only one solar panel array antenna node is used in the network to transmit data.

Although block 710 describes use of a plurality of support structures as antennas, in some embodiments just one support structure may be so used. Similarly, although blocks 705 and 710 describe use of a plurality of each of the solar panel arrays, support structures, and radio transceivers, in at least some embodiments only one of each of these elements may be used, in which case block 715 may comprise sending a signal from the radio transceiver via the support structure without necessarily including a reception of the signal by another support structure's radio transceiver.

Figure 8:
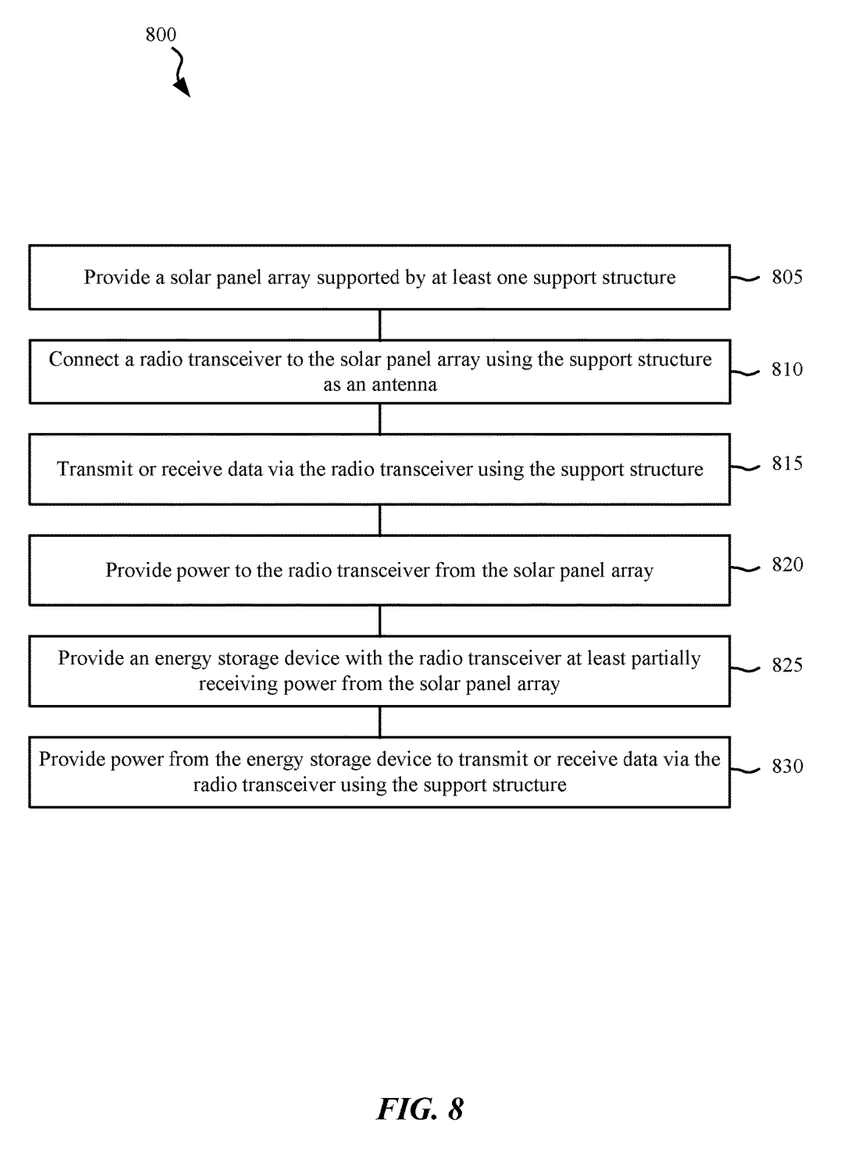
FIG. 8 is a flowchart illustrating another process of administering a communications network according to an embodiment of the present disclosure.

FIG. 8 is a flowchart illustrating another process of administering a communications network according to an embodiment of the present disclosure. In block 805, a solar panel array is provided that is supported by at least one support structure. In block 810, a radio transceiver is connected to the solar panel array using the support structure as an antenna, and in block 815, data is transmitted or received via the radio transceiver using the support structure. Blocks 805, 810, and 815 may be performed in the manner described above in connection with blocks 705, 710, and 715, where possible.

In block 820, power is provided to the radio transceiver from the solar panel array. For example, the radio transceiver may receive power via a power line between the solar panel array and the radio transceiver (e.g., a power line 210 between solar panel array 105 and radio transceiver 115, as described in FIG. 2). Power conditioning or conversion apparatus may also be included to adapt the power being produced by the solar panel array for provision to the radio transceiver, if necessary. The power provided to the radio transceiver may originate from the solar panel array that has the support structure that the radio transceiver may use as an antenna.

In block 825, an energy storage device is provided with the radio transceiver, and the energy storage device at least partially receives power from the solar panel array. The energy storage device may be ESS 205 and connected in the manner shown in FIG. 2. The energy storage device may partially receive power from the solar panel array or may solely receive power from the solar panel array. In some embodiments, the energy storage device may also receive energy from a power line or provide energy to a power line (e.g., power line 210). In block 830, power may be provided from the energy storage device to the radio transceiver to transmit or receive data using the support structure as an antenna. In some embodiments, the power may be provided solely from the energy storage device, such as in situations where standard power sources such as an electrical utility grid are unavailable or not connected to the radio transceiver and/or energy storage device.

Moreover, regarding the signals described herein, those skilled in the art will recognize that a signal can be directly transmitted from a first node to a second node, or a signal can be modified (e.g., amplified, attenuated, delayed, latched, buffered, inverted, filtered, or otherwise modified) between the nodes in a network.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A solar panel array structure for network communications, the structure comprising:
a solar panel comprising a support structure configured to support at least a portion of a solar panel array, the support structure comprising an antenna portion configured to affix the solar panel to a structure while operating as a radio antenna, the antenna portion comprising a multiplexer or a switching matrix configured to connect the support structure to a radio transceiver.

2. The structure of claim 1, further comprising:
a second antenna portion coupled with the support structure, the second antenna portion comprising a second radio transceiver.

3. The structure of claim 2, wherein at least one of the antenna portion or the second antenna portion are configured to communicate with a data network.

4. The structure of claim 2, wherein the antenna portion is configured to operate on a different frequency than the second antenna portion.

5. The structure of claim 1, wherein the support structure comprises at least one conductive material.

6. The structure of claim 5, wherein at least a portion of the antenna portion comprises the at least one conductive material.

7. The structure of claim 5, further comprising:
a plurality of additional support structures each coupled with the support structure, wherein each of the plurality of additional support structures comprises the at least one conductive material.

8. The structure of claim 7, wherein each of the plurality of additional support structures are configured to selectively communicate with a data network.

9. The structure of claim 1, further comprising:
at least one energy storage device coupled with the solar panel, wherein the antenna portion is powered based at least in part on the energy storage device.

10. The structure of claim 1, wherein the antenna portion comprises a patch antenna.

11. A solar panel array structure for network communications, the structure comprising:
a plurality of support structures configured to support at least a portion of a solar panel array; and
at least one antenna coupled with the plurality of support structures, the at least one antenna comprising a multiplexer or a switching matrix configured to connect the support structure to a radio transceiver and configured to communicate with a data network.

12. The structure of claim 11, wherein the radio transceiver is coupled with at least one of the plurality of support structures, the radio transceiver configured to communicate with the data network.

13. The structure of claim 11, wherein the at least one antenna is located between a first support structure and a second support structure and comprises a patch antenna.

14. A method of administering a wireless data network, the method comprising:
identifying at least one solar panel array supported by a plurality of support structures;
connecting an antenna portion of the at least one solar panel array to a data network, the antenna portion comprising a multiplexer or a switching matrix configured to connect the support structure to a radio transceiver; and
transmitting data between the antenna portion and the data network.

15. The method of claim 14, wherein the data network comprises a Long Term Evolution (LTE) data network.

16. The method of claim 14, further comprising:
charging at least one energy storage device from the at least one solar panel array, wherein the antenna portion is powered based at least in part on charging the at least one energy storage device.

17. The method of claim 14, wherein the antenna portion comprises a sectorized antenna.

18. The method of claim 17, further comprising:
connecting a plurality of sectorized antennas of the at least one solar panel array to the data network, wherein the transmitting is based at least in part on connecting the plurality of sectorized antennas to the data network.

19. The method of claim 14, wherein the antenna portion comprises a Point to Point (PtP) link or a Point to Multi-Point (PtMP) link in the wireless data network.

20. The method of claim 14, wherein a radiation pattern emitted from the antenna portion is based at least in part on a material of the at least one solar panel array.

* * * * *